United States Patent [19]
Mauler et al.

[11] 3,883,395
[45] May 13, 1975

[54] MEDIUM FOR THE CULTIVATION OF MYCOPLASMS

[75] Inventors: Rudolf Mauler, Cappel near Marburg Lahn; Edgar Reichert, Marbach near Marburg Lahn, both of Germany

[73] Assignee: Behringwerke Aktiengesellschaft, Marburg/Lahn, Germany

[22] Filed: Mar. 13, 1973

[21] Appl. No.: 340,699

[30] Foreign Application Priority Data
Mar. 18, 1972 Germany............................ 2213240

[52] U.S. Cl. ................ 195/100; 195/101; 195/102; 195/103
[51] Int. Cl.............................................. C12k 1/10

[58] Field of Search ............ 195/99, 100, 101, 102, 195/103

[56] References Cited
UNITED STATES PATENTS
3,725,203  4/1973  Sellers................................ 195/100
3,798,127  3/1974  Dogariu et al.................. 195/100 X Primary Examiner—Lionel M. Shapiro
Assistant Examiner—Robert J. Warden
Attorney, Agent, or Firm—Curtis, Morris & Safford

[57] ABSTRACT

Culture media for the cultivation of mycoplasms comprising an aqueous dispersion of amino acids, carbohydrates, yeast extract, inorganic salts, and lecithin.

9 Claims, No Drawings

MEDIUM FOR THE CULTIVATION OF MYCOPLASMS

The present invention relates to a medium for the cultivation of mycoplasms, in particular *Mycoplasma pneumoniae* which is the pathogenic agent causing diseases of the respiratory tract. The inactivated mycoplasms serve for the preparation of vaccines for the prophylaxis of atypical pneumoniae and other affections of the respiratory tract and for the preparation of reagents for serological examinations.

Media for the cultivation of mycoplasms have already been described. However, they contain animal components such as fractions of calf serum, chick egg allantois liquid or yolk/chloroform extract and therefore have the disadvantage that they can cause anaphylactic reactions in the vaccinated person.

Attempts have already been made to cultivate mycoplasms in cell cultures using cell culture media. However, the mycoplasms absorb cell components which have an anaphylactogenic action. In addition, working with cell cultures is cumbersome, time-consuming and expensive. A further disadvantage is that the cultivation in cell cultures gives poor yields of mycoplasms.

Now, we have found a medium for the cultivation of mycoplasms which contains amino-acids, carbohydrates, yeast extract, preferably its dialysis product, sodium chloride and potassium chloride and lecithin, the last-mentioned product preferably in combination with cholesterol and/or ergosterol.

The medium of the present invention is used in particular for the cultivation of *Mycoplasma pneumoniae* (*M. pneumoniae*). However, it is also suited for the cultivation of other mycoplasms, for example *M. fermentans*, *M. mycoides*, *M. laidlawii*, *M. hominis* I, *M. orale* I, *M. orale* II, *M. flora*, and *M. salivarium*.

As regards the amino-acids, the following acids are essential components of the medium:

glutamine or glutamic acid and valine, furthermore in combination with these, other amino-acids, preferably leucine, isoleucine, methionine or cystine, in the following concentrations (mg/l):

| | | |
|---|---|---|
| glutamine | 3.0 – 3000, preferably | 600 mg/l |
| glutamic acid | 3.0 – 3000, preferably | 600 mg/l |
| valine | 0.1 – 400, preferably | 40 mg/l |
| leucine | 1.0 – 600, preferably | 60 mg/l |
| isoleucine | 2.0 – 200, preferably | 40 mg/l |
| methionine | 1.0 – 100, preferably | 20 mg/l |
| cystine | 0.1 – 100, preferably | 20 mg/l |

Further components of the medium of the invention are carbohydrates. As such carbohydrates, there may be used in the first instance glucose, but also mannose, fructose, xylose, maltose, starch, dextrin or glycogen, in concentrations of 0.1 to 50 g/l, preferably 5 g/l.

The yeast extract can be obtained in known manner from fresh baker's yeast; it is also possible to use commercial preparations in the form of a dry substance in a correspondingly lower concentration. The concentration of the yeast extract or of the dialysis product in the medium should be about 40 – 160 ml, preferably 80 ml, per liter of cultivation medium.

Sodium chloride and potassium chloride are used in the following concentrations:

sodium chloride 5.0 – 20.0, preferably 6.8 g/l
potassium chloride 0.1 – 3.0, preferably 0.4 g/l.

Lecithin is used in a concentration of 0.01 mg/l – 10 g/l, preferably 20 mg/l, and cholesterol and ergosterol are used in concentrations of 0.01 mg/l – 10.0 g/l, preferably 2 mg/l.

Instead of the above-mentioned amino-acids, there may also be used one of the commercial tissue culture media, for example Eagle's Basalmedium, TCM 199, Leibovits Medium L 15 or Parker's Medium CMRL 1066. It is, however, then necessary to add 4 g of carbohydrates, preferably glucose, per liter of solution, since the 1 g/liter of carbohydrates contained in these media is not sufficient for the purpose of the invention. The content of salts in the tissue culture media does not necessitate a special addition of sodium chloride or potassium chloride to form media for the cultivation of mycoplasms.

The pH-value of the new medium is adjusted to 6.5 – 8.2, preferably to 7.6. For this purpose, 0.1 – 1.0 N-sodium hydroxide solution is used. The best temperature for the cultivation of mycoplasms is in the range of from 25° to 39° C, preferably from 35° to 37° C.

The concentration of mycoplasms is measured by a growth test. The solution to be tested is diluted in a series of dilutions in a culture medium containing agar-agar and then incubated at 37° C. The number of colonies grown after 7 days corresponds to the number of infectious units contained in the solution.

The infectious units obtained according to the invention can be inactivated, preferably with formaldehyde, and then worked up in known manner, for example with aluminum hydroxide, to a vaccine.

These infectious units may also be used as reagent for the determination of antibodies. Such a reagent has the advantage that it does not provoke unspecific reactions since it does not contain antigens of animal origin from the culture medium.

The following Examples illustrate the invention:

EXAMPLE 1

1 Liter of an aqueous solution was prepared from the following components:

| | |
|---|---|
| Inorganic salts: | 6.8 g of sodium chloride |
| | 0.4 g of potassium chloride |
| Amino-acids: | 20 mg of cystine |
| | 600 mg of glutamine |
| | 600 mg of glutamic acid |
| | 40 mg of isoleucine |
| | 60 mg of leucine |
| | 20 mg of methionine |
| | 40 mg of valine |
| Carbohydrates: | 5000 mg of glucose |

This solution was combined with 0.2 ml of the following emulsion: 100 ml of a 0.9 percent solution of sodium chloride which had been adjusted to pH 7.2 with phosphate buffer (Sorensen) and contained 10 g of lecithin and 1 of cholesterol, were stirred mechanically at 20° C until an emulsion had formed. This emulsion was sterilized for 60 minutes at 120° C in an autoclave. Any lumps that had formed thereby were comminuted by renewed stirring.

Then, 40 ml of yeast extract were added to the batch. This extract had been prepared as follows:

1 Kg of fresh commercial baker's yeast was suspended in 1 liter of distilled water, heated to 80° C and kept for 30 minutes at 80° C, and centrifuged. The supernatant was recovered and filtered under sterile conditions. The pH-value of the medium was then adjusted to 7.6 by means of 1-N-sodium hydroxide solution.

The solution obtained in the above-described manner was used as nutrient medium for *Mycoplasma pneumoniae*. It was infected with 1 ml of a suspension of Mycoplasma pneumoniae, corresponding to about $10^9$ infectious units per liter, and kept for 3 days at 37° C. During that time the mycoplasms proliferated and showed after 3 days a concentration of about $10^{12}$ infectious units per ml. During the proliferation of the mycoplasms, the pH-value was kept at 7.6; for this purpose the pH-value was controlled every 6 hours and, if necessary, adjusted by addition of 1-N sodium hydroxide solution.

1000 ml of the suspension so prepared, which contained about $10^{12}$ units per ml of Mycoplasma pneumoniae were combined with 1 ml of a 35 percent formaldehyde solution and kept for 2 hours at 37° C. The solution was then cooled to 4° C and after 12 hours at 4° C, it was centrifuged for 2 hours with 53000 g. The supernatant was rejected. The sediment, about 2 ml, was taken up in 20 ml of 0.9 percent phosphate-buffered sodium chloride and mixed with aluminium hydroxide until a concentration of 0.1 percent was attained. This suspension represented the vaccine and was tested on Guinea pigs.

In this test, 10 Guinea pigs were immunized twice at an interval of 10 days with each time 1 ml of the vaccine. 10 days after the second injection, sera were taken from the Guinea pigs and tested for their capacity to neutralize Mycoplasma pneumoniae. It was found that 1 ml of Guinea pig's serum neutralized $10^8$ infectious units of Mycoplasma pneumoniae.

EXAMPLE 2

0.2 ml of the emulsion prepared according to Example 1, 40 ml of yeast extract and 4 g of glucose were added to 1 liter of Eagle's medium. The whole was infected with Mycoplasma pneumoniae and kept for 3 days at 37° C. A titer of $10^{13}$ units per ml was thereby obtained.

EXAMPLE 3

0.2 ml of the emulsion prepared according to Example 1 and 4 g of glucose were added to 920 ml of Eagle's medium. Then, 80 ml of yeast extract were added which had been prepared as follows:

100 ml of yeast extract, prepared as described in Example 1, were dialyzed for 24 hours at 4° C against 1 liter of distilled water. The outer dialysate (1 liter), which contained only the dialyzable low molecular weight components, was concentrated in a rotary evaporator at 10° C to one tenth of its volume. If desired, the outer dialysate may also be freeze-dried.

The mixture so obtained was then infected with *Mycoplasma pneumoniae* and kept for 3 days at 37° C. A titer of $10^{11}$ infectious units/ml was thereby obtained.

EXAMPLE 4

100 ml of the medium according to Example 1, which, however, had the following composition of amino-acids:

| | |
|---|---|
| 600 mg of glutamic acid | / liter |
| 40 mg of isoleucine | / liter |
| 20 mg of methionine | / liter |
| 60 mg of leucine | / liter |
| 40 mg of valine | / liter | were infected with *Mycoplasma pneumoniae*. $10^{13}$ infectious units/ml were thereby obtained.

EXAMPLE 5

100 ml of the medium according to Example 1, which, however, had the following composition of amino-acids:

| | |
|---|---|
| 600 mg of glutamine | / liter |
| 40 mg of isoleucine | / liter |
| 20 mg of methionine | / liter |
| 60 mg of leucine | / liter |
| 40 mg of valine | / liter | were infected with *Mycoplasma pneumoniae*. $10^9$ infectious units/ml were obtained.

EXAMPLE 6

0.2 ml of an emulsion which had been prepared as described in Example 1, but which contained in addition to 10 g of lecithin and 1 g of cholesterol also 1 g of ergosterol per 100 ml, were added to 1 liter of Eagle's medium which additionally contained 4 g of glucose and 40 ml of yeast extract. This medium was infected with *Mycoplasma pneumoniae*. After an incubation period of 3 days at 37° C, the culture contained $10^{15}$ units.

EXAMPLE 7

0.2 ml of an emulsion which had been prepared as described in Example 1, but which contained only 10 g of lecithin per 100 ml, were added to 1 liter of Eagle's medium which additionally contained 4 g of glucose and 40 ml of yeast extract. This medium was infected with *Mycoplasma pneumoniae*. After an incubation time of 3 days at 37° C, the culture contained $10^9$ units.

We claim:

1. A medium for the cultivation of mycoplasms consisting essentially of an aqueous dispersion of glutamine or glutamic acid, valine, carbohydrate, yeast extract, an inorganic salt, and lecithin.

2. A medium as in claim 1 wherein an additional amino acid other than glutamine or glutamic acid and valine is present.

3. A medium as in claim 2 wherein said additional amino acid is at least one member selected from the group consisting of leucine, isoleucine, methionine, and cystine.

4. A medium as in claim 1 additionally containing at least one member selected from the group consisting of cholesterol and ergosterol.

5. A medium as in claim 1 wherein said carbohydrate is at least one member selected from the group consisting of glucose, mannose, fructose, xylose, maltose, starch, dextrin, and glycogen.

6. A medium as in claim 1 wherein said inorganic salt is at least one member selected from the group consisting of sodium chloride and potassium chloride.

7. In a method for the cultivation of mycoplasms in a nutrient medium, the improvement wherein said medium is the nutrient medium of claim 1.

8. A method as in claim 7 wherein said mycoplasm is *Mycoplasma pneumoniae*.

9. An aqueous medium for the cultivation of mycoplasms, containing 3.0 – 3,000 mg/liter of glutamine or glutamic acid, 0.1 to 400 mg/liter of valine, 0.1 to 50 g/liter of carbohydrates, 40 to 160 ml/liter of yeast extract, 5.0 – 20.0 g/liter of sodium chloride, 0.1 to 3.0 g/liter of potassium chloride and 0.01 to 10,000 mg/liter of lecithin.

* * * * *